US012760644B2

(12) United States Patent
Molla et al.

(10) Patent No.: US 12,760,644 B2
(45) Date of Patent: Oct. 13, 2026

(54) DETERMINING RESERVOIR FLUID PHASE ENVELOPE FROM DOWNHOLE FLUID ANALYSIS DATA USING PHYSICS-INFORMED MACHINE LEARNING TECHNIQUES

(71) Applicant: Schlumberger Technology Corporation, Sugar Land, TX (US)

(72) Inventors: Shahnawaz Hossain Molla, Watertown, MA (US); Farshid Mostowfi, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1030 days.

(21) Appl. No.: 17/755,093

(22) PCT Filed: Oct. 22, 2020

(86) PCT No.: PCT/US2020/056821
§ 371 (c)(1),
(2) Date: Apr. 21, 2022

(87) PCT Pub. No.: WO2021/081177
PCT Pub. Date: Apr. 29, 2021

(65) Prior Publication Data

US 2022/0364465 A1 Nov. 17, 2022

Related U.S. Application Data

(60) Provisional application No. 62/924,195, filed on Oct. 22, 2019.

(51) Int. Cl.
*G06N 3/084* (2023.01)
*E21B 49/08* (2006.01)
*G06N 3/04* (2023.01)
*G06N 3/0499* (2023.01)
*G06N 3/09* (2023.01)

(52) U.S. Cl.
CPC ........... *E21B 49/0875* (2020.05); *G06N 3/04* (2013.01); *G06N 3/084* (2013.01); *E21B 2200/22* (2020.05)

(58) Field of Classification Search
CPC ........... G06F 30/25; G06F 30/27; G06F 30/28
See application file for complete search history.

(56) References Cited

U.S. PATENT DOCUMENTS 7,586,087 B2 9/2009 Dong et al.
7,966,273 B2 6/2011 Hegeman et al.
(Continued)

FOREIGN PATENT DOCUMENTS

EP 1865147 A1 12/2007
WO 2014200861 A1 12/2014

OTHER PUBLICATIONS

Phase Envelope Construction for Mixtures with Many Components. Dan Vladimir Nichita. Energy & Fuels 2008 22 (1), 488-495 DOI: 10.1021/ef700251k (Year: 2008).*
(Continued)

*Primary Examiner* — Ryan F Pitaro
*Assistant Examiner* — Jay Michael White
(74) *Attorney, Agent, or Firm* — Jeffrey D. Frantz

(57) ABSTRACT

Methods and apparatus provide for determining a reservoir fluid phase envelope from downhole fluid analysis data using machine learning techniques.

18 Claims, 16 Drawing Sheets

(56) References Cited

U.S. PATENT DOCUMENTS

| | | | |
|---|---|---|---|
| 8,434,356 B2 | 5/2013 | Hsu et al. | |
| 9,109,434 B2 | 8/2015 | Indo et al. | |
| 9,334,729 B2 | 5/2016 | Indo et al. | |
| 2003/0182061 A1 | 9/2003 | Ferworn et al. | |
| 2009/0030858 A1 | 1/2009 | Hegeman et al. | |
| 2009/0288881 A1* | 11/2009 | Mullins | E21B 47/022 175/50 |
| 2009/0306897 A1 | 12/2009 | Dong et al. | |
| 2012/0053838 A1* | 3/2012 | Andrews | E21B 49/10 73/23.35 |
| 2013/0062514 A1* | 3/2013 | Csutak | G01J 3/10 250/262 |
| 2013/0103627 A1 | 4/2013 | Maddinelli et al. | |
| 2014/0096955 A1* | 4/2014 | Indo | E21B 49/08 166/250.01 |
| 2014/0239168 A1* | 8/2014 | Wang | E21B 49/08 250/269.1 |
| 2014/0293282 A1* | 10/2014 | Indo | E21B 49/08 356/402 |
| 2015/0204189 A1 | 7/2015 | Indo | |
| 2015/0292324 A1 | 10/2015 | Jackson et al. | |
| 2016/0032719 A1 | 2/2016 | Chen et al. | |
| 2017/0370214 A1* | 12/2017 | Wang | E21B 49/0875 |
| 2018/0171769 A1 | 6/2018 | Gu | |
| 2018/0299374 A1 | 10/2018 | Holman | |
| 2018/0320517 A1 | 11/2018 | Indo et al. | |
| 2018/0335538 A1 | 11/2018 | Dupont et al. | |
| 2018/0371905 A1 | 12/2018 | Chen et al. | |
| 2019/0120049 A1 | 4/2019 | Chen | |

OTHER PUBLICATIONS

Krig, Scott. (2016). Computer Vision Metrics. 10.1007/978-3-319-33762-3. (Year: 2016).*

Ortiz-Rodriguez, Jose Manuel & MartÃ-nez-Blanco, Ma. Del Rosario & Viramontes, Jose & Vega-Carrillo, Hector. (2013). Robust Design of Artificial Neural Networks Methodology in Neutron Spectrometry. 10.5772/3409. (Year: 2013).*

Dr. Sandro Skansi, "Introduction to Deep Learning" 2018) Electronic ISBN 978-3-319-73004-2 (Year: 2018).*

Keras programming manual. "Functions". https://www.tensorflow.org/api_docs/python/tf/keras/losses (Year: 2018).*

Huang, Steeve. "Predicting Cryptocurrency Price With Tensorflow and Keras" (Year: 2018).*

Straton, N., Mukkamala, R. R., & Vatrapu, R. (2017). Big Social Data Analytics for Public Health: Predicting Facebook Post Performance Using Artificial Neural Networks and Deep Learning, Proceedings of the 6th IEEE International Congress on Big Data. BigData Congress 2 (Year: 2017).*

Torrbjorn T, "Multiple layers in neural network diagram" https://tex.stackexchange.com/questions/362238/multiple-hidden-layers-in-neural-network-diagram (Year: 2017).*

Jordan, Jeremy. "Convolutional Neural Networks" https://www.jeremyjordan.me/convolutional-neural-networks/ (Year: 2017).*

Agrawal, Ayush. "Building Neural Network From Scratch" https://aayushmnit.com/posts/2018-06-03-Building_neural_network_from_scratch/ (Year: 2018).*

Perez-Enciso, M.; Zingaretti, L.M. A Guide on Deep Learning for Complex Trait Genomic Prediction. Genes 2019, 10, 553. https://doi.org/10.3390/genes10070553 (Year: 2019).*

Roughgarden, Tom and Valiant Gregory. CS168: The Modern Algorithmic Toolbox Lecture #6: Stochastic Gradient Descent and Regularization. (Year: 2016).*

Girosi, Federico & Jones, Michael & Poggio, Tomaso. (1995). Regularization Theory and Neural Networks Architectures. Neural Computation. 7. 219-269. 10.1162/neco.1995.7.2.219. (Year: 1995).*

McCaffrey, James. "Neural Network L2 Regularization using Python" https://visualstudiomagazine.com/articles/2017/09/01/neural-network-l2.aspx (Year: 2017).*

Mostafa Lashkarbolooki, Zeinab Sadat Shafipour, Ali Zeinolabedini Hezave, Hamid Farmani, Use of artificial neural networks for prediction of phase equilibria in the binary system containing carbon dioxide, The Journal of Supercritical Fluids, vol. 75, 2013, pp. 144-151 (Year: 2013).*

Indo, K., et al., Estimation of Fluid Composition From Downhole Optical Spectrometry. SPE Journal, 2015. 20(06): p. 1326-1338.

Zuo, J.Y., et al., Equation-of-State-Based Downhole Fluid Characterization. 2011, SPE 114702, (10 pages).

Dong, C., et al., New Downhole-Fluid-Analysis Tool for Improved Reservoir Characterization. SPE Reservoir Evaluation Engineering, 2008. 11(6): p. 1107-1116.

International Search Report and Written Opinion issued in PCT Application PCT/US2020/056821, dated Jan. 25, 2021 (10 pages).

James, G., et al., An Introduction to Statistical Learning with Applications in R. Springer Texts in Statistics. 2013: Springer-Verlag New York, pp. 15-36.

Hastie, T., R. Tibshirani, and J. Friedman, The Elements of Statistical Learning. Springer Series in Statistics. 2009: Springer-Verlag New York. 745, pp. 389-403.

Hastie, T., R. Tibshirani, and J. Friedman, The Elements of Statistical Learning. Springer Series in Statistics. 2009: Springer-Verlag New York. 745, pp. 18-32.

International Search Report and Written Opinion issued in the PCT Application PCT/US2020/056811, dated Feb. 2, 2021 (11 pages).

International Preliminary Report on Patentability issued in PCT Application No. PCT/US2020/056811 dated May 5, 2022, 6 pages.

International Preliminary Report on Patentability issued in PCT Application No. PCT/US2020/056821 dated May 5, 2022, 7 pages.

Office Action issued in U.S. Appl. No. 17/755,090 dated Aug. 29, 2024, 34 pages.

Extended Search Report issued in European Patent Application No. 20878322.5 dated Oct. 11, 2023, 7 pages.

* cited by examiner

| $C_1$ | $C_2$ | ••• | $C_{6+}$ | T |
|---|---|---|---|---|
| 20 | 5 | ••• | 40 | 200 |
| 20 | 5 | ••• | 40 | 205 |
| ••• | ••• | ••• | ••• | ••• |
| 20 | 5 | ••• | 40 | 600 |
| 35 | 10 | ••• | 20 | 200 |
| ••• | ••• | ••• | ••• | ••• |
| 35 | 10 | ••• | 20 | 600 |

Input

| $P_{high}$ | $P_{low}$ |
|---|---|
| 3000 | 0 |
| 3200 | 0 |
| ••• | ••• |
| 2500 | 2450 |
| 4500 | 0 |
| ••• | ••• |
| 3000 | 2950 |

Output

DETERMINING RESERVOIR FLUID PHASE ENVELOPE FROM DOWNHOLE FLUID ANALYSIS DATA USING PHYSICS-INFORMED MACHINE LEARNING TECHNIQUES

CROSS-REFERENCE TO RELATED APPLICATIONS

The present application is a National Stage Entry of International Patent Application No. PCT/US2020/056821, filed on Oct. 22, 2020, which claims priority to U.S. Provisional Application No. 62/924,195, filed on Oct. 22, 2019, the entirety of which is incorporated herein by reference.

FIELD OF THE DISCLOSURE

Aspects of the disclosure relate to analysis of fluids obtained from hydrocarbon recovery operations. More specifically, aspects of the disclosure relate to determining fluid phase envelopes from downhole fluid analysis data using machine learning techniques.

BACKGROUND

When reservoir fluids are produced from the subsurface formation condition, the fluid experiences varying temperature (T) and pressure (P) as the fluid flows from the reservoir through the wellbore to the surface, as shown in FIG. 1A. The physical properties of the fluid also vary as a function of P & T. In order to successfully produce oil and gas, it is preferable to understand how the fluid will behave under different conditions. Conventional techniques use thermodynamic models, such as Equation-of-State (EoS), to predict the fluid behavior. An equation of state "EoS" model can generate a phase envelope for a given fluid. FIG. 1B shows an example of the phase changes in a black oil as the pressure drops along the production path (A to E). The pressure and temperature (P & T) conditions along the flow path are shown relative to the phase envelope of the oil. Phase envelopes show the boundary between single-phase and 2-phase regions on a P-T space; e.g., the bubble point line shows the pressure ($P_{sat}$) at which dissolved gas starts to evolve from the oil at a given temperature. When pressure falls below $P_{sat}$, 2 distinct phases, namely, liquid and gas, are present in the fluid. Therefore, by knowing the phase envelope of a specific fluid, it is possible to predict its phase behavior during production.

To develop a reliable EoS model, fluid composition data should be provided from a gas chromatography test along with several other laboratory measurements, such as stock-tank oil density, $P_{sat}$ measurement, etc. These fluid properties are measured by conventional pressure-volume-temperature (PVT) tests in a fluid analysis laboratory. Therefore, a representative sample of the reservoir fluid must be collected and transported to the lab to perform the necessary measurements. Once a realistic representation of the fluid has been developed, an EoS model can reliably predict fluid properties at any P and T along the production path. However, it could take several months to transport a fluid sample to the lab and conduct PVT tests. Until then, an operator cannot build an understanding of the reservoir fluid. Additionally, the EoS model development process requires expertise in the reservoir fluid analysis domain.

There is a need to provide an apparatus and methods that will permit a user or operator to identify fluid parameters quickly and efficiently.

There is a further need to provide apparatus and methods that are adaptable to changing conditions.

There is a still further need to reduce the time to evaluate a model compared to conventional methods and apparatus.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method is disclosed. The method comprises collecting data of a downhole fluid and processing the collected data. The method further comprises inputting the processed collected data to an artificial neural network and estimating saturation pressures based upon the processing of the collected data. The method may further comprise producing a phase envelope for the downhole fluid based upon the estimated saturation pressures.

In another example embodiment, a method of training an artificial neural network for processing data related to a downhole fluid is disclosed. The method may comprise collecting data related to the downhole fluid and processing the collected data related to the downhole fluid. The method may also comprise producing a qualified dataset of the processed collected data and partitioning the qualified dataset of the collected data into a testing data portion and a training data portion. The method may also comprise performing an output validation on the testing data portion. The method may comprise training an artificial neural network model to produce a training data output. The method may also comprise performing an output validation on the training data output.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

Figure 1A:
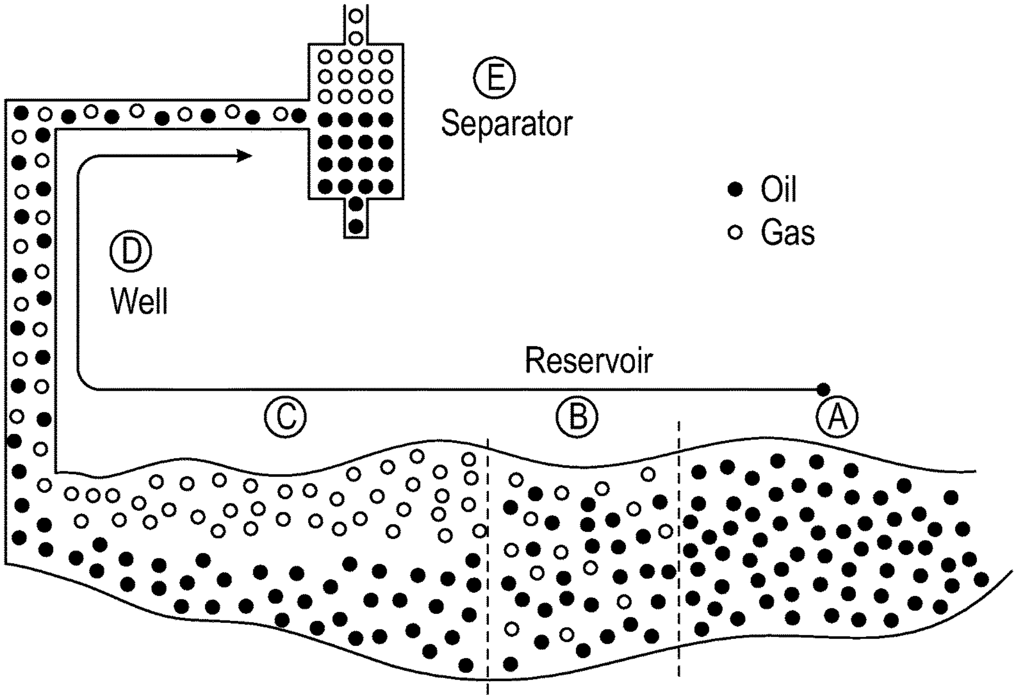
FIG. 1A is a depiction of fluid flow for a geological stratum.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 2A:
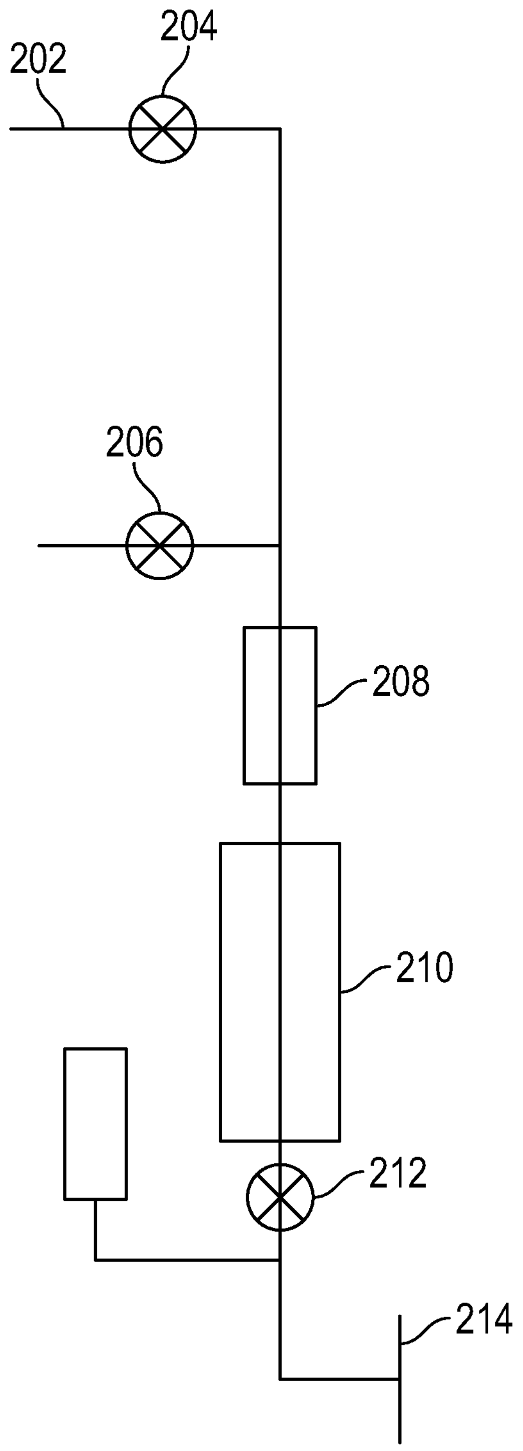
FIG. 2A is a tool string with a downhole fluid analysis (DFA) module used for sampling fluid in a downhole environment.
Figure 2B:
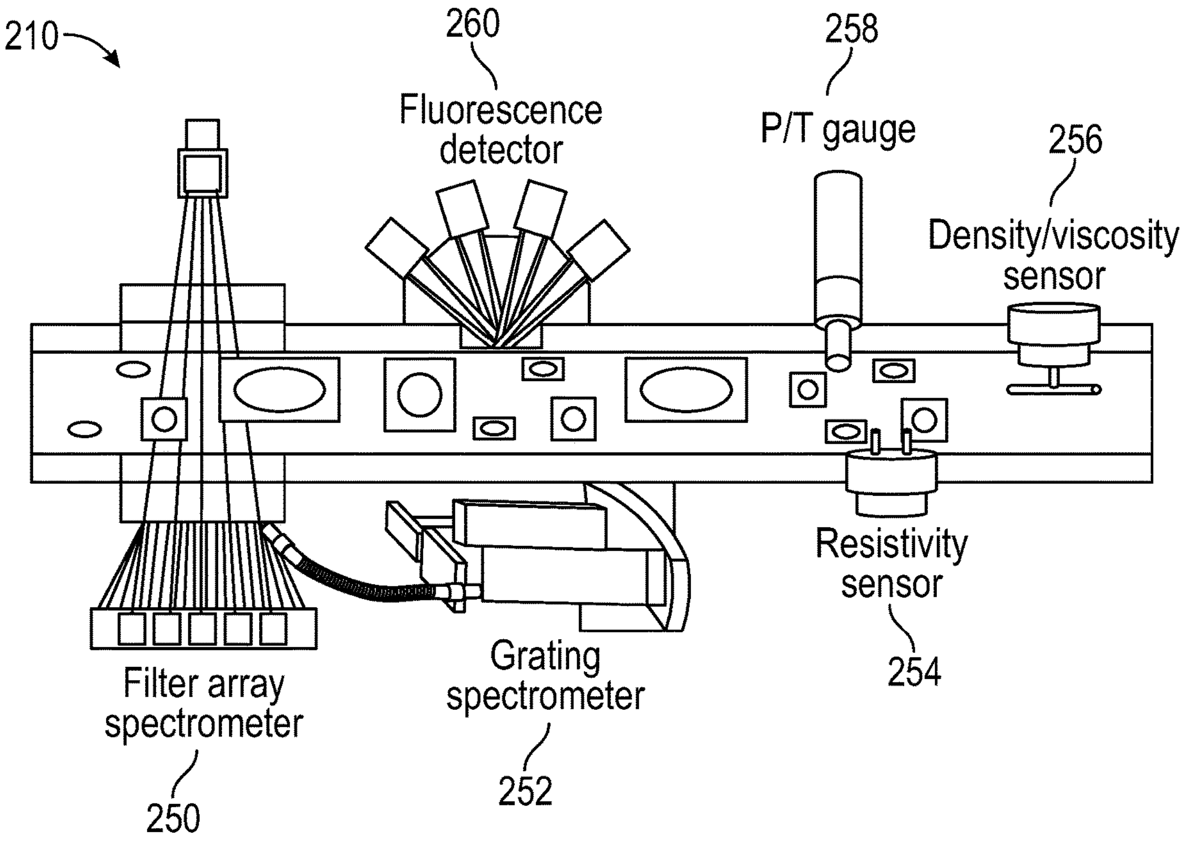
FIG. 2B is an arrangement of a DFA optical module and other sensors in the flowline.

In this disclosure, methods are described to estimate phase envelope of a reservoir fluid from subsurface measurements. In subsurface condition, a Downhole Fluid Analyzer (DFA) tool is used to measure basic fluid composition [carbon-di-oxide ($CO_2$), methane ($C_1$), ethane ($C_2$), propane ($C_3$)-n-pentane ($C_5$), and hexane plus fraction ($C_{6+}$)] of the formation fluid at reservoir P and T and use these measurements to identify the fluid type and predict gas-oil-ratio of the fluid. FIG. 2A shows a schematic of a tool-string with the fluid analysis module. In the embodiment, a pump 208 is connected to a DFA system 210 that is used to optically analyze downhole fluids. Valves 204, 206, 212 allow for isolation of different parts of the system. Fluids enter the system through a probe 214 connected to the DFA system 210. Loop back capability is provided by a connection 202. These measurements play a role in ensuring that the formation fluid sample collected downhole has minimum level of contamination. The composition is inferred by measuring the optical absorbance data of the formation fluid using a downhole spectrometer (FIG. 2B). Additionally, the pressure, temperature, density and viscosity of the fluid is concurrently measured. In FIG. 2B, a portion of the DFA system 210 is described. A filter array spectrometer 250, a grating spectrometer 252, a resistivity sensor 254, a density/viscosity sensor 256, a P/T gauge 258 and a fluorescence detector 260.

Here, a workflow is described where the DFA tool measurements are used to estimate the phase envelope of a reservoir fluid. Such real-time fluid property estimation would enable us to build a preliminary model of the reservoir fluid during exploration phase.

Figure 1B:
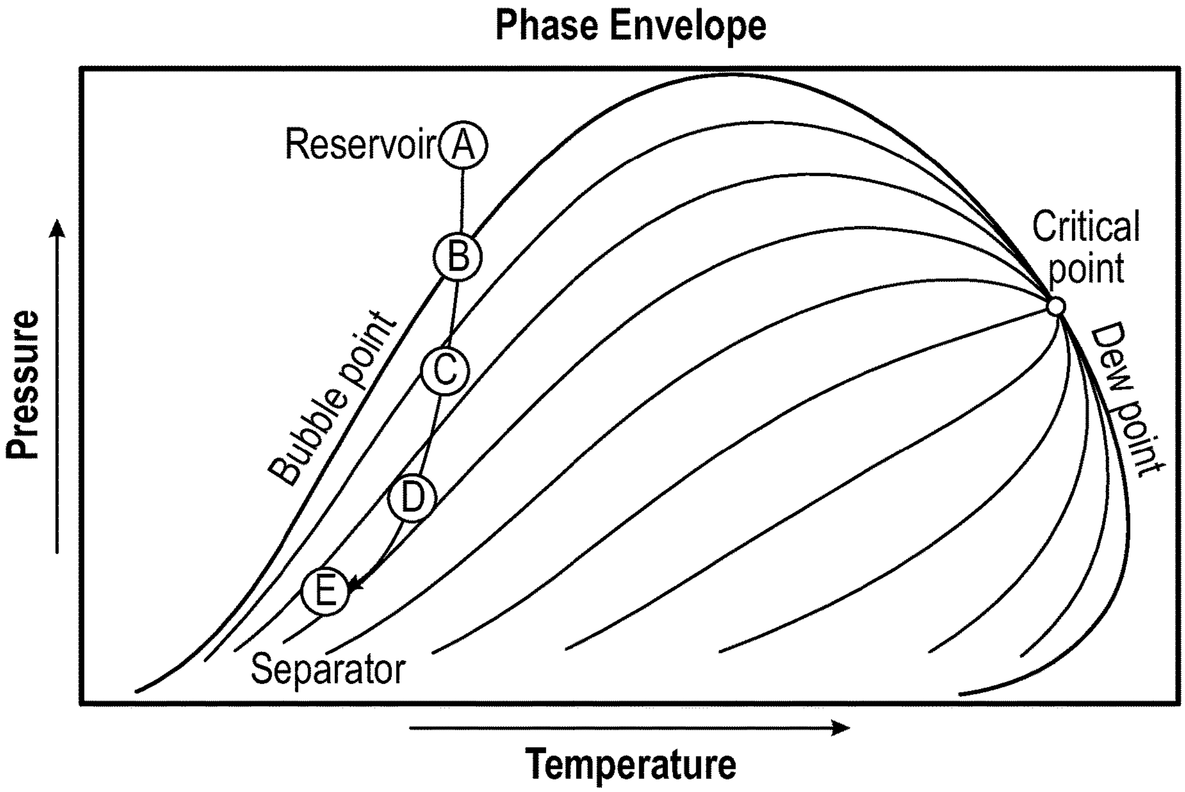
FIG. 1B depicts an example of the phase changes in a black oil as the pressure drops along the production path.

Methods are described herein to incorporate measurements from sensors on the DFA module into a statistical learning model to estimate the phase envelope of a reservoir fluid at downhole condition. Here it is demonstrated that an artificial neural network (ANN) can be used to estimate the bubble-point and the dew-point lines (see FIG. 1B) from basic DFA fluid composition.

Figure 2C:
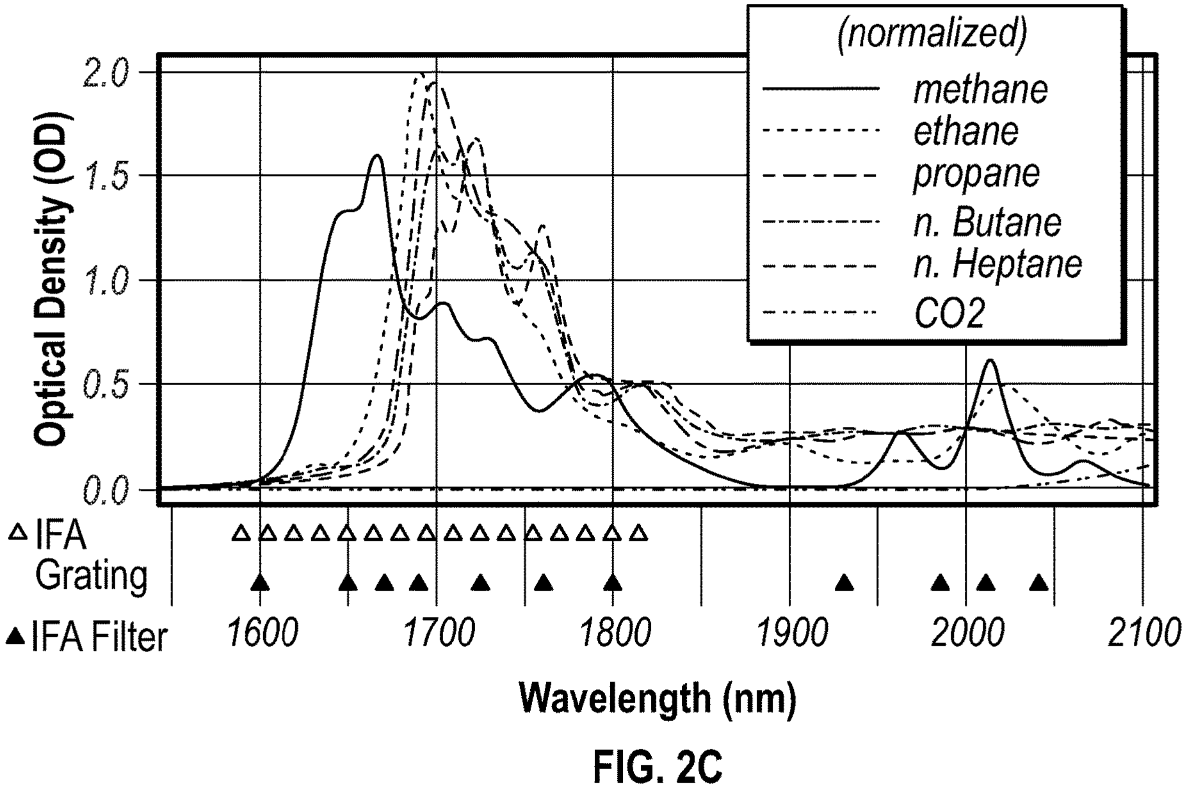
FIG. 2C is an optical spectra analysis of different hydrocarbons at different wavelengths.

The DFA optical module collects optical information of the fluid in the flow line using the downhole spectrometer. The spectrometer measures optical absorbance of the fluid at multiple wavelengths as shown in FIG. 2B. A schematic of optical spectrum of several alkanes and carbon dioxide over a range of wavelengths (1550-2100 nm) is shown in FIG. 2C. These optical spectra are processed to identify the fluid type and to quantify the weight fraction of hydrocarbons ($C_1$, $C_2$, $C_3$-$C_5$, and $C_{6+}$) and $CO_2$ in the fluid. As illustrated, normalized envelopes from the left most figure are methane, ethane, propane, n-butane, n-heptane and $CO_2$.

General physical models are not used to directly use DFA measurements to generate phase envelope of the reservoir fluid. In this disclosure, however, the use of an artificial neural network (ANN) is used to build a predictive model to estimate the phase envelope with a given set of input parameters, such as DFA composition. ANN models are commonly used for estimating/predicting an output based on one or more relevant inputs. Here, the ANN architecture is specifically designed to ensure that the predictions are physically consistent and guided by thermodynamic constraints.

An example of the phase envelope estimation is described below based on measurements obtained from the DFA tool.

Artificial Neural Network (ANN)

Figure 3A:
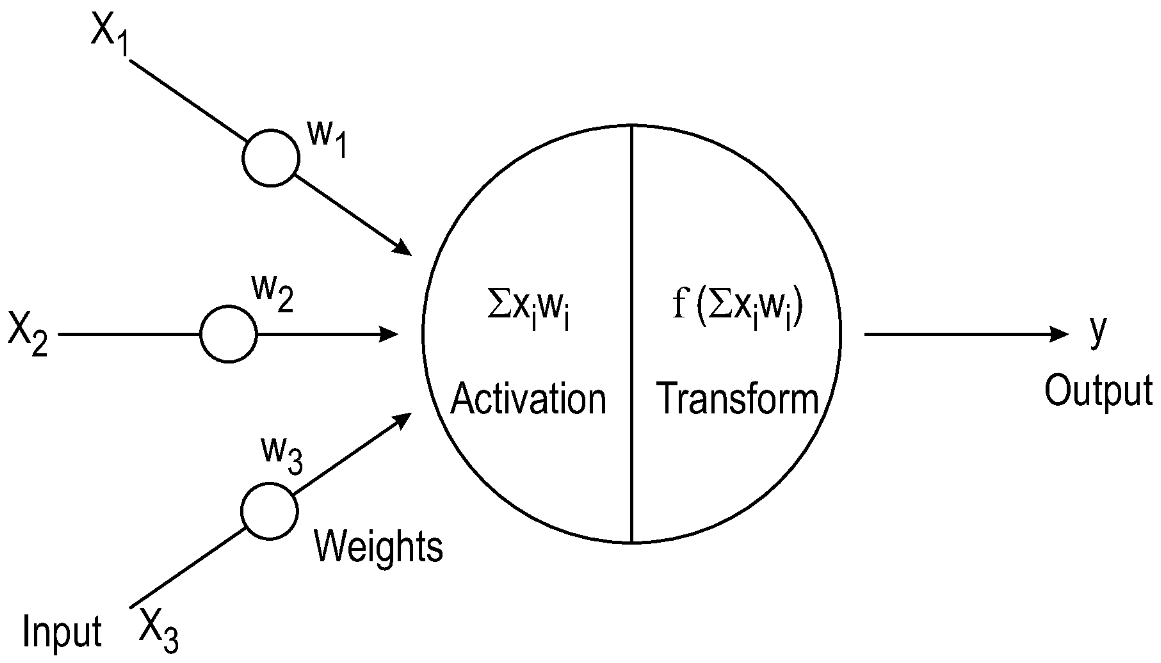
FIG. 3A is a schematic representation of an artificial neuron unit.

Here, an ANN is used to predict fluid properties using fluid measurement values collected using DFA tools. An ANN is a nonlinear statistical data modeling tool composed of interconnected neuron-like processing units that relate input data to output data. An ANN can be trained to learn correlations or relationships between data to model complex global behavior among that data using neuron parameters. (Each neuron has weighted inputs, transfer function and one output, as shown in FIG. 3A. The artificial neuron is the building component of the ANN. The inputs ($x_i$) to a neuron multiplied by the connection weights ($w_i$) are first summed and then passed through a transfer function to produce the output (y) for that neuron, as shown in FIG. 3A. The activation function is the weighted sum of the neuron's inputs and the most commonly used transfer function is the sigmoid function. As presented, input may be described at x1, x2 and x3 with associated weights w1, w2 and w3. An output y is provided after activation and transformation within the node.

A neural network is trained to map a set of input data to the outputs by iterative adjustment of the weights. The ANN reads the input and output values in the training data set and changes the value of the weighted links to reduce the difference between the predicted ($y_{predict}$) and target values ($y_{target}$). Optimization of the weights is made by backward propagation of the error during training or learning phase.

The error in prediction is minimized across many training cycles until network reaches specified level of accuracy. If the network is over-trained, however, it loses the ability to generalize (overfitting problem). In this case, a cost function is defined which was comprised of the mean squared error and a regularization term to reduce overfitting.

$$\text{Cost} = \frac{1}{N}\sum_{i=1}^{N}(y_{target,i} - y_{predict,i})^2 + \lambda_{reg}R_{reg}(f) \quad (1)$$

where, $$\{x, y\}_1^N$$

is the training set with N individual data points, x is a vector of input parameters ($x_i$), $R_{reg}$(.) controls the ANN model complexity by penalizing large weights, and $\lambda_{reg}$ is a hyper-parameter to define regularization strength. An Adam optimizer is used to minimize the cost function. Additional terms can be added to the right-hand-side of Eq. (1) to further penalize the cost function to account for other constraints; e.g., to incorporate laws of physics.

Figure 3B:
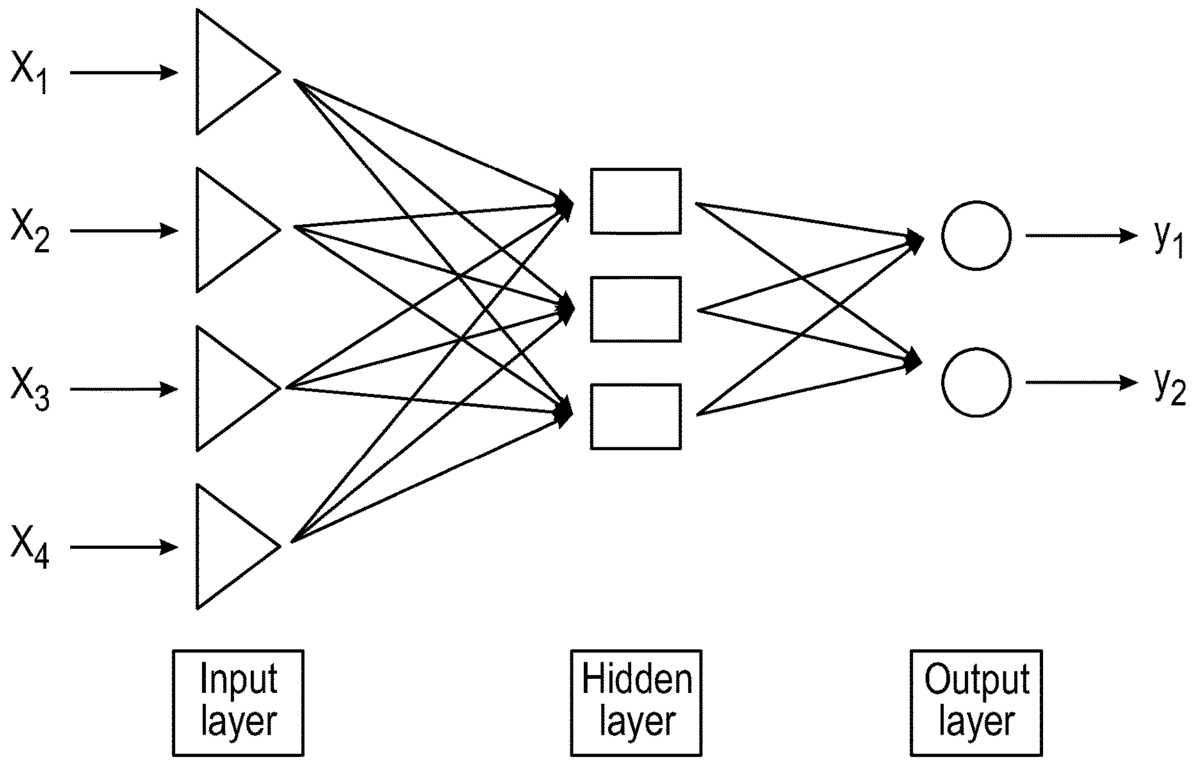
FIG. 3B is schematic representation of a fully connected feed-forward artificial neural network.

A fully connected supervised network is used as shown in FIG. 3B. The ANN was organized in layers, the input layer, the output layer, and 2 hidden layers between them. The input layer neurons receive data from a data file. The output neurons provide ANN's response to the input data.

When the ANN produces the desired output with sufficient accuracy the weighted links between the units are saved. These weights are then used as an analytical tool to predict results for a new set of input data.

Phase Envelope Estimation

To build the ANN model, a carefully selected set of fluids is used for which the phase envelopes were available. The fluids were comprised of 21 synthetic fluids and 19 crude oils. The phase envelopes for these fluids were used for training the ANN model. The composition ($C_1$, $C_2$, $C_3$-$C_5$, $C_{6+}$, $CO_2$, $H_2S$ mol % etc.) of the fluids and temperature (T) were used as input to the ANN to estimate the saturation pressures ($P_{sat}$) at the respective T. Equation of State EoS models were used to generate the phase envelopes in the training sets to ensure that the training data is thermodynamically consistent.

Figure 4:
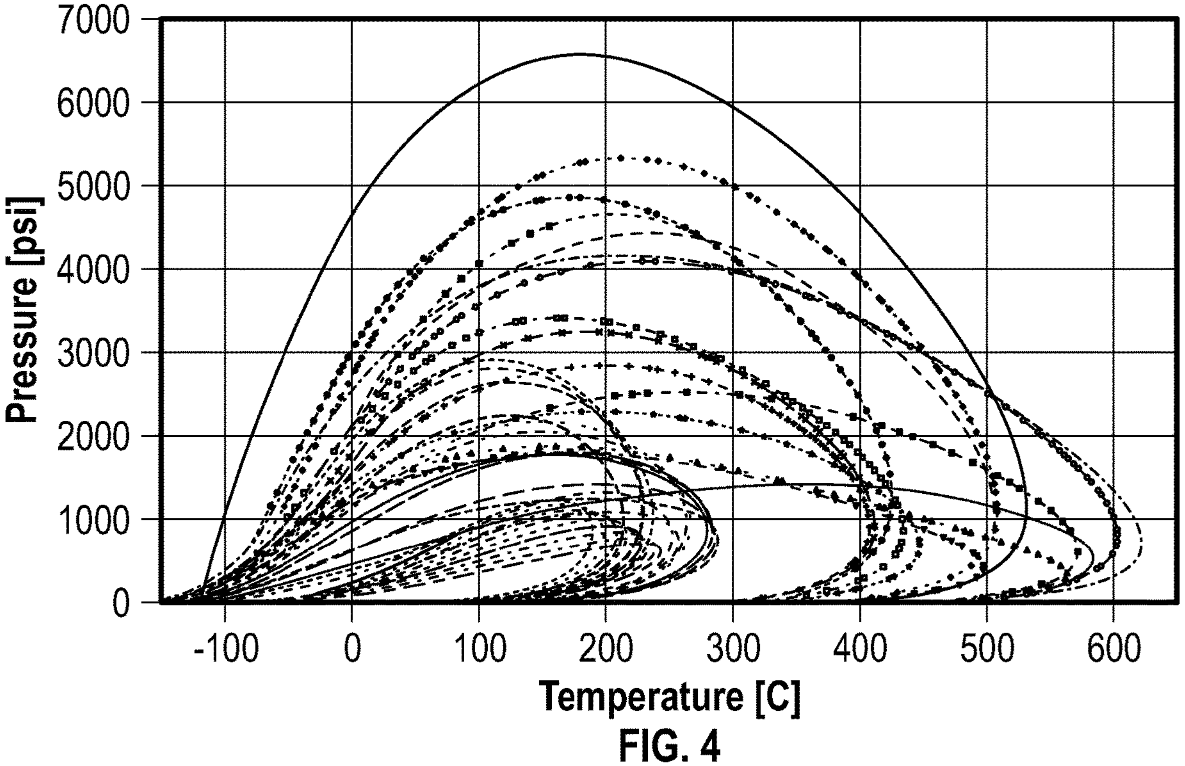
FIG. 4 is a phase envelope used in a training dataset for the artificial neural network of FIG. 3B.

The synthetic samples were designed as a 5-component mixture of n-alkanes ($C_1$, $C_2$, $C_3$, $nC_7$, $nC_{10}$). These synthetic fluids are ideal mixtures which can be reliably modelled with EoS models. The mole percent of each component was varied ($C_1$: 10-60%, $C_2$: 5-25%, $C_3$: 5-35%, $nC_7$: 7-35%, $nC_{10}$: 7-31%) to generate 21 unique mixtures. The Peng-Robinson equation-of-state model was used to generate accurate phase envelope of each mixture based on the mixture composition. The synthetic fluids were represented as $C_1$, $C_2$, $C_3$, $C_{6+}$=$C_7$+$C_{10}$) fractions. The EoS models of the crude oils were developed using full oil composition obtained from laboratory gas chromatography technique. For simplicity, the $C_{6+}$ fraction of the oils was represented as a single lumped parameter. For each oil, the EoS model was tuned using high-quality laboratory PVT measurements to ensure accuracy of the phase envelope. The phase envelopes in the training dataset are shown in FIG. 4; the black lines represent the synthetic fluids and the colored lines with symbols represent the oils.

Once the phase envelopes were generated, a limited composition ($C_1$, $C_2$, $C_3$-$C_5$, $C_{6+}$, $CO_2$, $H_2S$, $N_2$ mol %) was used as input to the ANN to ensure that the model can be used with DFA-generated composition later.

Training Data Generation

Figure 5A:
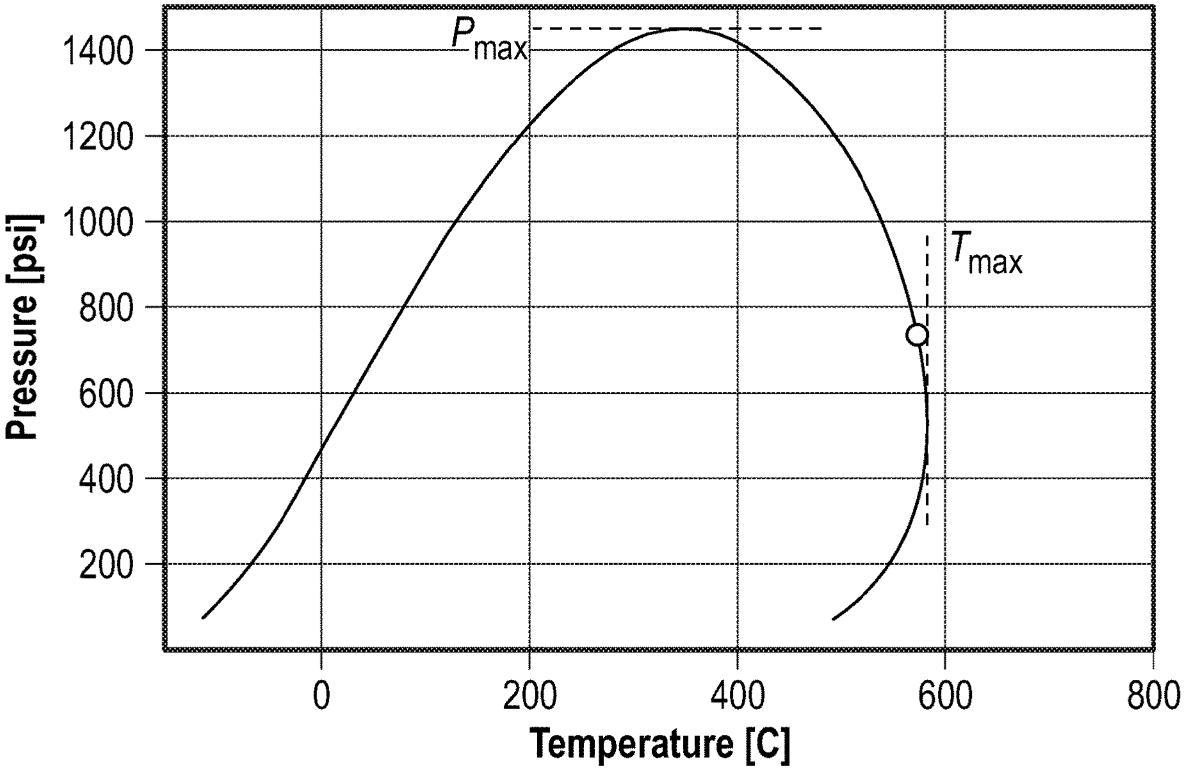
FIG. 5A is a phase-temperature plot showing a phase envelope of a hydrocarbon fluid.
Figure 5B:
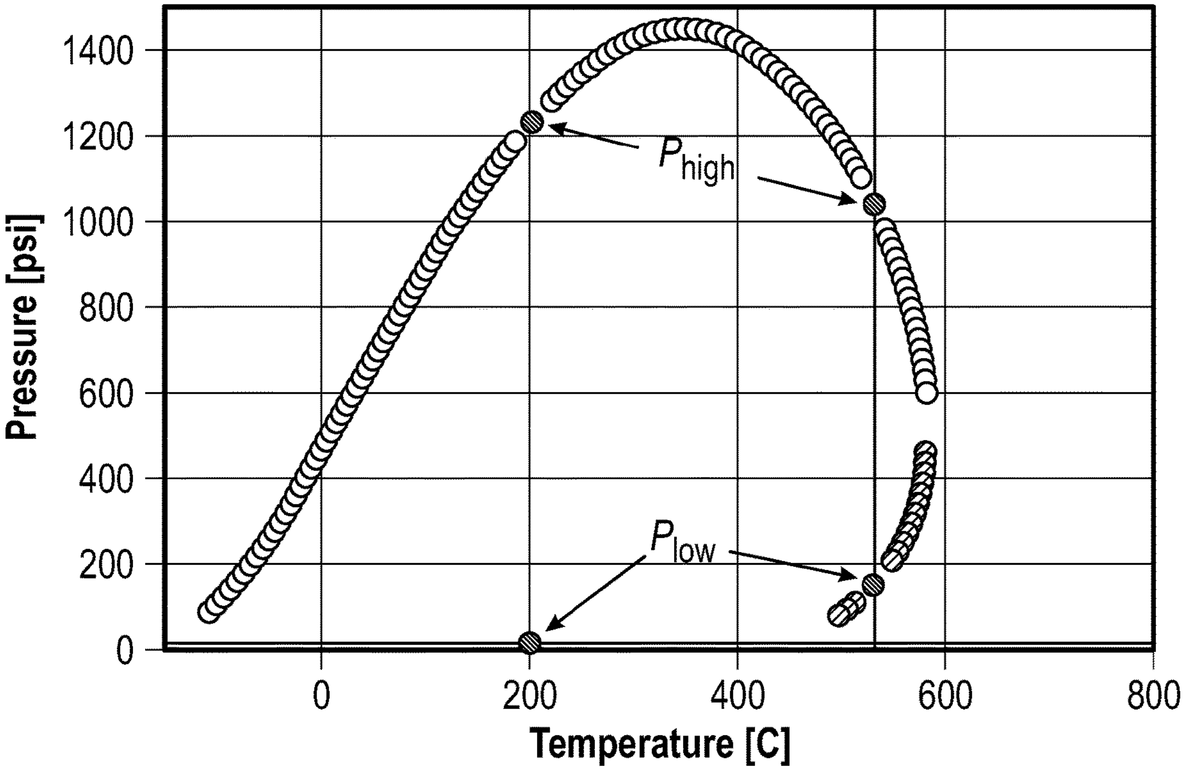
FIG. 5B is a saturation line that is discretized using a temperature grid.

The phase envelope of each fluid is discretized to create a training data corresponding to its composition. Each phase envelope on the P-T plot has maximum pressure ($P_{max}$) and a maximum temperature ($T_{max}$), as shown in FIG. 5A. In this example, the phase envelope is discretized along the temperature axis. A grid ranging from −150 deg C. to $T_{max}$. is used. A high-density grid was used in regions of high-curvature (near $P_{max}$ and $T_{max}$) on the envelope. At each grid point, the $P_{sat}$ values are used. As can be seen in FIG. 5B, in some parts of the envelope, there exists 2 $P_{sat}$ values at a given T. To account for this characteristic, 2 $P_{sat}$ values are encoded at each T; namely, $P_{high}$ and $P_{low}$ (see FIG. 5B). In parts in case a $P_{sat}$ value was not available on the phase envelope at the grid point, the value was estimated by linearly interpolating the 2 adjacent $P_{sat}$ values. The discretized data was stored in a data table for each composition.

Model Design and Training

Figure 6:
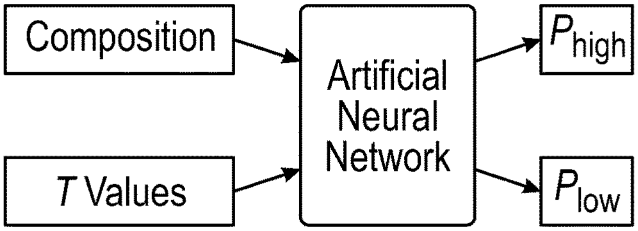
FIG. 6 is a schematic diagram of an artificial neural network (ANN).
Figure 7A:
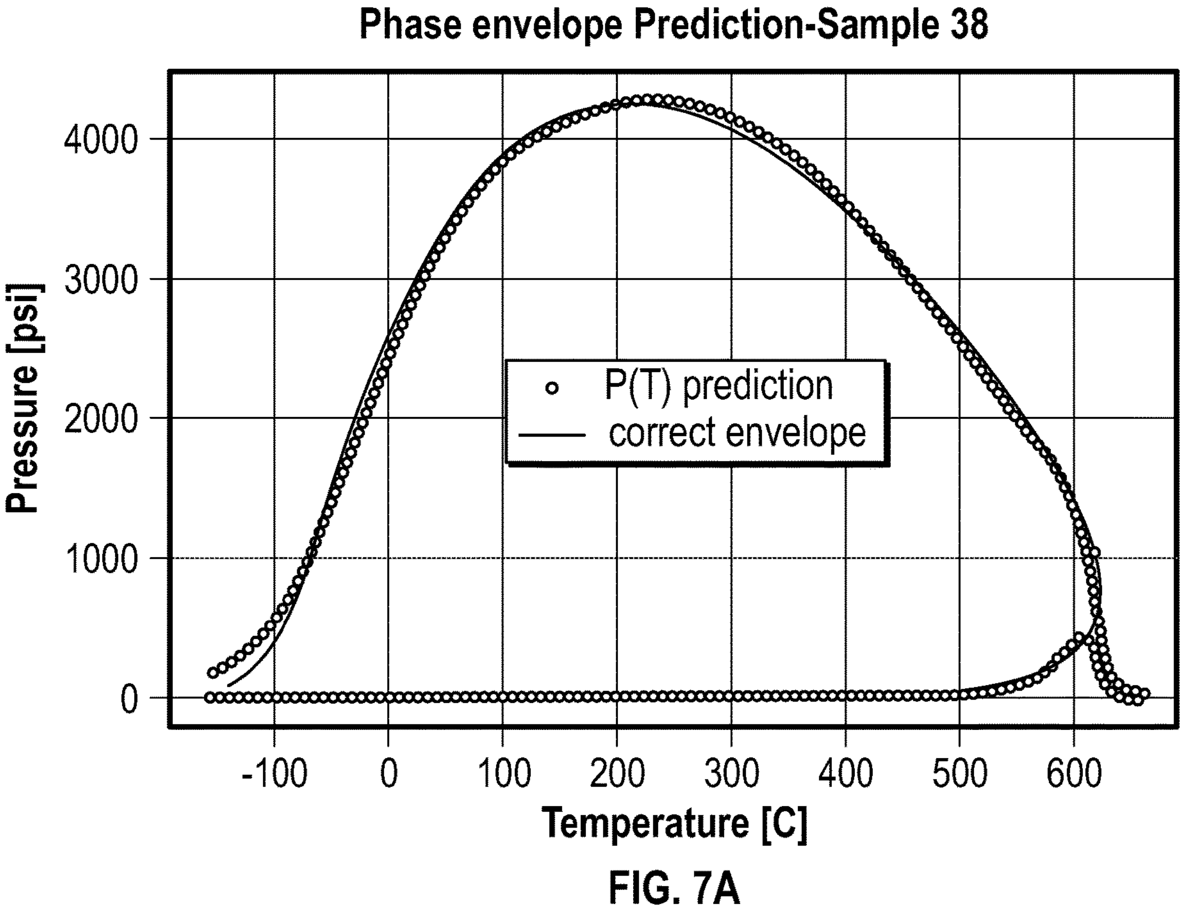
FIG. 7A is a phase envelope prediction of a first reservoir fluid.
Figure 7B:
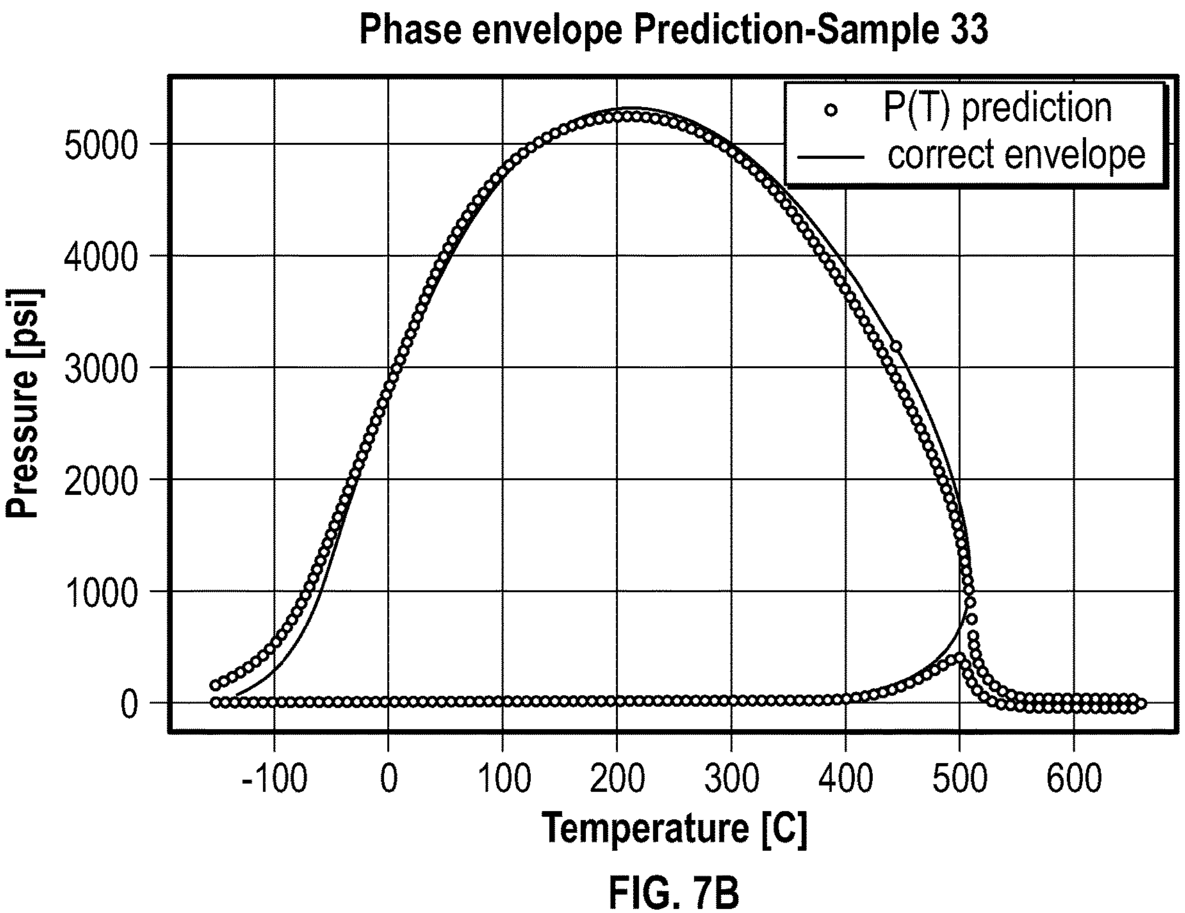
FIG. 7B is a phase envelope prediction of a second reservoir fluid.

A fully-connected ANN with 2 hidden layers was used in this example. The input layer had 8 inputs ($C_1$, $C_2$, $C_3$-$C_5$, $C_{6+}$, $CO_2$, $H_2S$, $N_2$ mol %, and T) and output layer had 2 outputs corresponding to $P_{high}$ and $P_{low}$. Each hidden layer had 5 neurons. This architecture was found to be sufficient based on trial and error. A schematic diagram of the ANN is shown in FIG. 6.

The ANN was trained using 39 out of 40 samples in the training set. The cost function was monitored during training and was continued until the cost function reached a stable minimum (in less than 50000 steps). After training, the model outputs were processed to check if the ANN correctly learned the training envelopes.

Phase Envelope Prediction

Then the trained model was used to estimate the phase envelope of the 1 sample that was not part of the training set. FIGS. 6A and 6B show results phase envelope predict ion for 2 crude oils. The phase envelope calculated by the EoS models are shown by the solid back line in the plots. The green line represents the phase envelope estimated by the ANN, which closely matches the EoS prediction. At grid points beyond the $T_{max}$ for each plot, the ANN estimated artificial values of $P_{high}$ and $P_{low}$. These estimations can be removed by restricting the grid values or during post-processing. The deviations at low T values can be minimized by incorporating an additional constraint in Eq. 1, as mentioned earlier.

The ANN model performed reasonably well considering the limited number of training data. Ideally, a training set with large variation in composition and corresponding tuned envelopes should be used. This would require building a large database of reservoir fluids with PVT data. In the absence of such a database, advanced machine learning techniques can be used to generate synthetic envelopes based on realistic fluid compositions.

Workflow

Figure 8A:
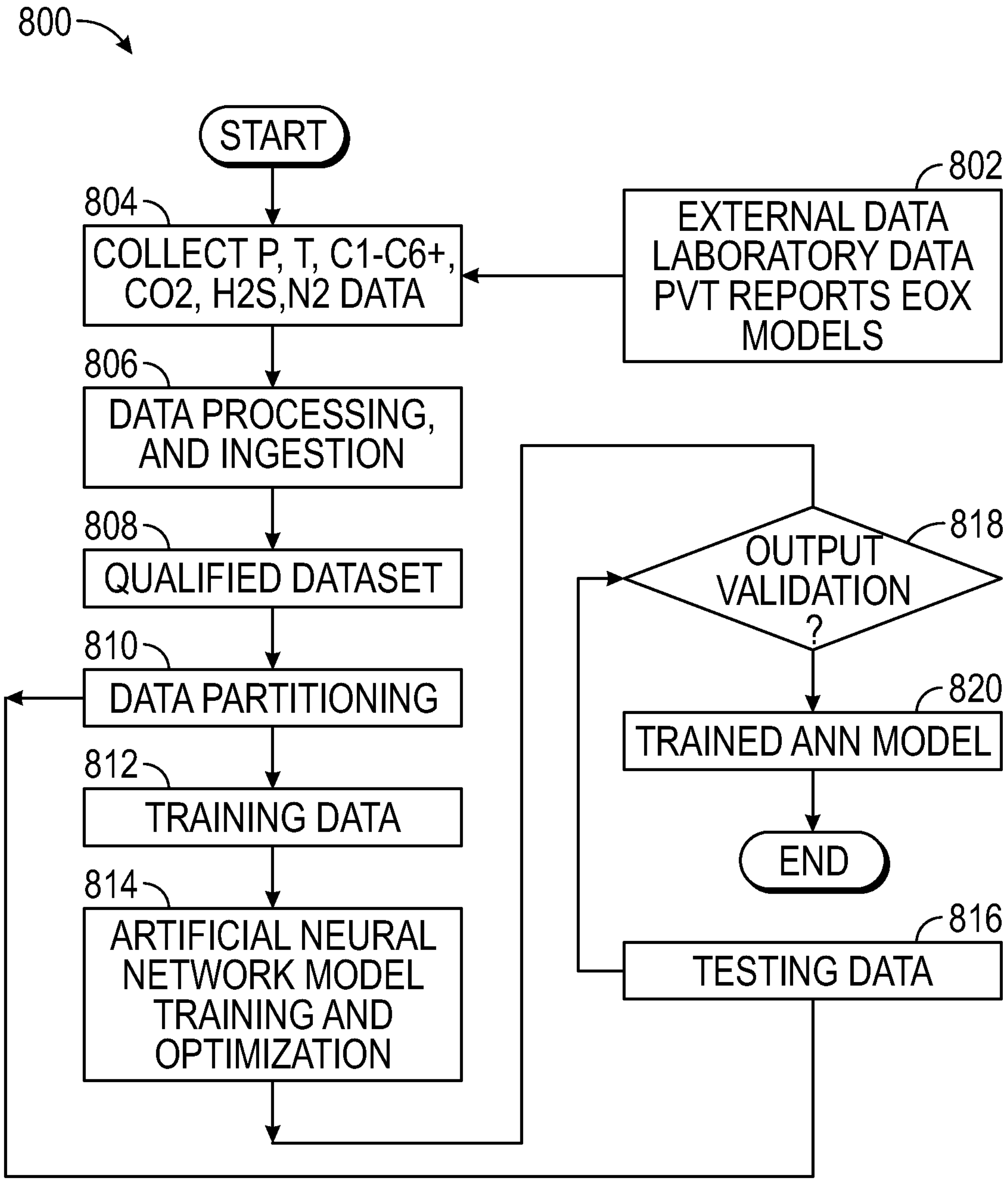
FIG. 8A is a method for estimating fluid phase envelope with data extraction, contexturalization, model training and validation with an artificial neural network.
Figure 8B:
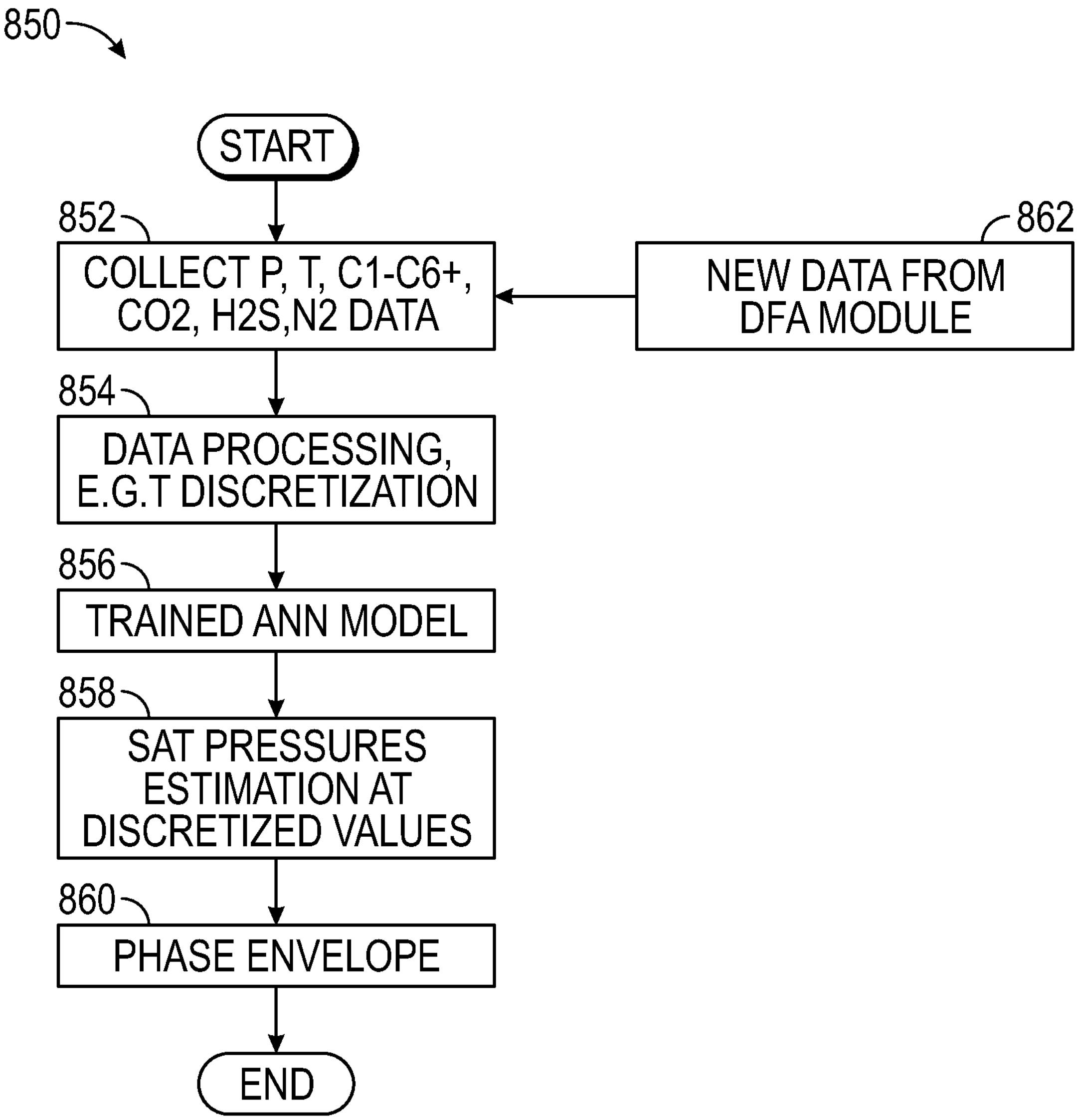
FIG. 8B is a method for phase envelope estimation with an artificial neural network.

The general workflow used in this example is shown as a flowchart in FIGS. 8A and 8B. A supervised learning approach was used here. However, this workflow can be extended further by including unsupervised learning algorithms. Similar workflow can be developed to estimate other fluid properties from DFA measurements.

Referring to FIG. 8A, a method 800 is provided. External data or laboratory data may be obtained at 802 and fed to information that is collected at 804, which may include pressure, temperature, C1 to C6+ values, $CO_2$, $H_2S$ and $N_2$ data. Data is then fed to a computing arrangement for data processing and ingestion at 806. As will be understood, an ANN may be used for processing the data. At 808, a qualified database dataset is established to be used with the ANN. At 810, data may be partitioned into training data or testing data. For testing data, the process continues to step 816, where the data is fed to the ANN and output is generated. The output is then validated at 818. For data used for training, the training data is provided to the ANN at 812 and fed to the ANN for model training and optimization at 814. Outputs for this training is submitted to output validation at 818. At 820, a trained ANN model is provided. Referring to FIG. 8B, a method 850 for phase envelope estimation with an artificial neural network. New data from a DFA module may be provided at 862 to an ANN. At 852, pressure, temperature, C1-C6+ values, $CO_2$, $H_2S$ and $N_2$ values are collected. These values may be collected by, for example, a DFA. At 854, the data from 862 and/or 852 is fed to an ANN and processed. For example, T discretization may occur at 854. At 856, a trained ANN model is used to process the data provided. At 858, saturation pressures are estimated at discretized T values. At 860, a phase envelope is calculated for a user based upon the saturation pressure estimations at 858.

Aspects of the disclosure also provide methods that may be performed to achieve a stated goal, including controlling components described in the specification. In some embodiments, the methods described may be performed by circuits and/or computers that are configured to perform such tasks.

Figure 9:
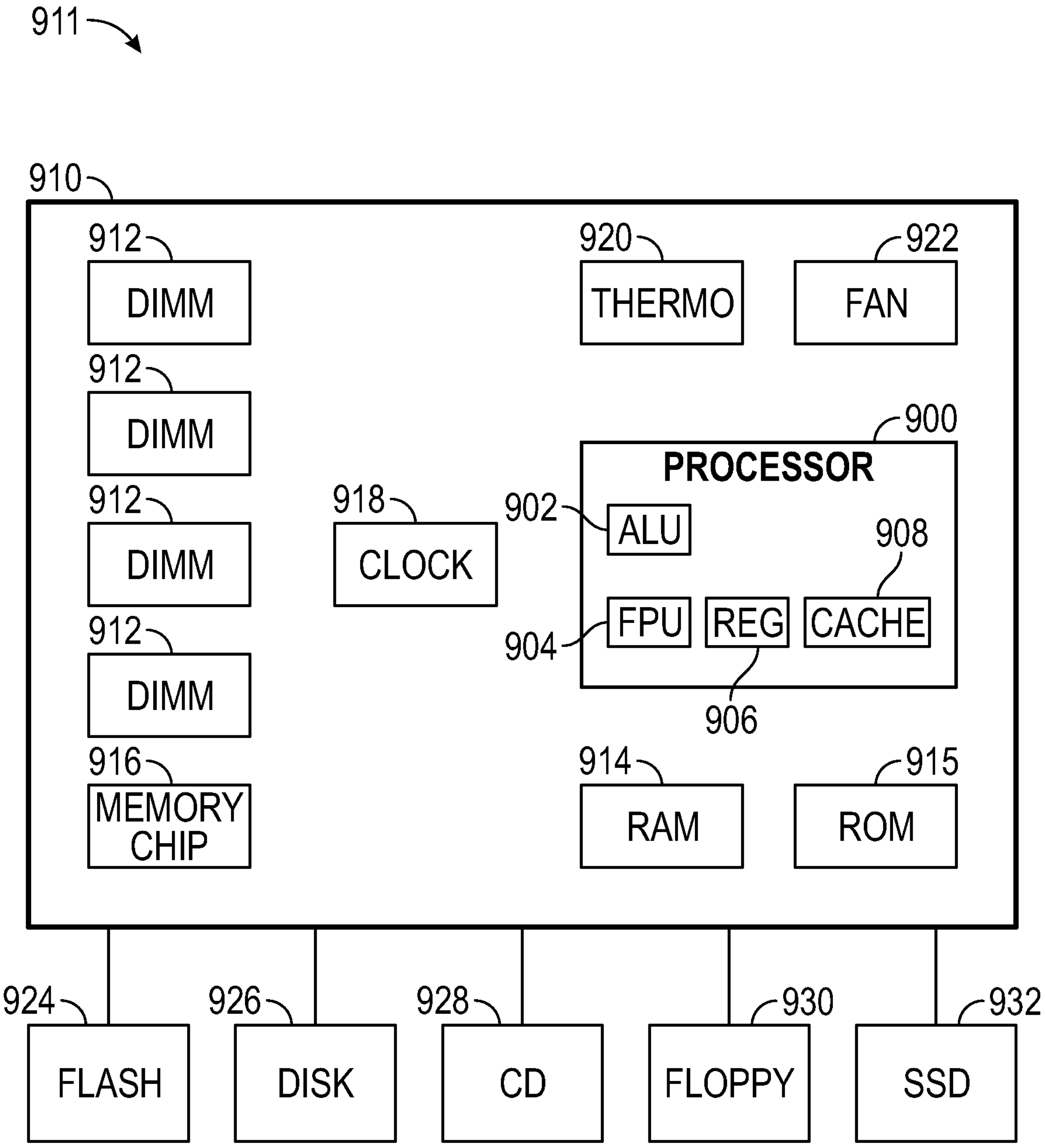
FIG. 9 is an example computer embodiment used to perform calculations for the artificial neural network of FIG. 8A and FIG. 8B.

In such embodiments, referring to FIG. 9, a computing apparatus used to perform the calculations for the methods described. In FIG. 9, a processor 900 is provided to perform computational analysis for instructions provided. The instruction provided, code, may be written to achieve the desired goal and the processor 900 may access the instructions. In other embodiments, the instructions may be provided directly to the processor 900.

In other embodiments, other components may be substituted for generalized processors. These specifically designed components, known as application specific integrated circuits ("ASICs") are specially designed to perform the desired task. As such, the ASIC's generally have a smaller footprint than generalized computer processors. The ASIC's, when used in embodiments of the disclosure, may use field programmable gate array technology, that allows a user to make variations in computing, as necessary. Thus, the methods described herein are not specifically held to a precise embodiment, rather alterations of the programming may be achieved through these configurations.

In embodiments, when equipped with a processor 900, the processor may have arithmetic logic unit ("ALU") 902, a floating point unit ("FPU") 904, registers 906 and a single or multiple layer cache 908. The arithmetic logic unit 902 may perform arithmetic functions as well as logic functions. The floating point unit 904 may be math coprocessor or numeric coprocessor to manipulate numbers more efficiently and quickly than other types of circuits. The registers 906 are configured to store data that will be used by the processor 900 during calculations and supply operands to the arithmetic unit and store the result of operations. The single or multiple layer caches 908 are provided as a storehouse for data to help in calculation speed by preventing the processor 900 from continually accessing random access memory ("RAM") 914.

Aspects of the disclosure provide for the use of a single processor 900. Other embodiments of the disclosure allow the use of more than a single processor 900. Such configurations may be called a multi-core processor where different functions are conducted by different processors to aid in calculation speed. In embodiments, when different processors are used, calculations may be performed simultaneously by different processors, a process known as parallel processing.

The processor 900 may be located on a motherboard 910. The motherboard 910 is a printed circuit board that incorporates the processor 900 as well as other components helpful in processing, such as memory modules ("DIMMS") 912, random access memory 914, read only memory, non-volatile memory chips 916, a clock generator 918 that keeps components in synchronization, as well as connectors for connecting other components to the motherboard 910. The motherboard 910 may have different sizes according to the needs of the computer architect. To this end, the different sizes, known as form factors, may vary from sizes from a cellular telephone size to a desktop personal computer size. The motherboard 910 may also provide other services to aid in functioning of the processor 900, such as cooling capacity. Cooling capacity may include a thermometer 920 and a temperature-controlled fan 922 that conveys cooling air over the motherboard 910 to reduce temperature.

Data stored for execution by the processor 900 may be stored in several locations, including the random access memory 914, read only memory 915, flash memory 924, computer hard disk drives 926, compact disks 928, floppy disks 930 and solid state drives 932. For booting purposes, data may be stored in an integrated chip called an EEPROM, that is accessed during start-up of the processor. The data, known as a Basic Input/Output System ("BIOS"), contains, in some example embodiments, an operating system that controls both internal and peripheral components.

Different components may be added to the motherboard or may be connected to the motherboard to enhance processing. Examples of such connections of peripheral components may be video input/output sockets, storage configurations (such as hard disks, solid state disks, or access to cloud based storage), printer communication ports, enhanced video processors, additional random access memory and network cards.

The processor and motherboard may be provided in a discrete form factor, such as personal computer, cellular telephone, tablet, personal digital assistant or other component. The processor and motherboard may be connected to other such similar computing arrangement in networked form. Data may be exchanged between different sections of the network to enhance desired outputs. The network may be a public computing network or may be a secured network where only authorized users or devices may be allowed access.

As will be understood, method steps for completion may be stored in the random access memory, read only memory, flash memory, computer hard disk drives, compact disks, floppy disks and solid state drives.

Different input/output devices may be used in conjunction with the motherboard and processor. Input of data may be through a keyboard, voice, Universal Serial Bus ("USB") device, mouse, pen, stylus, Firewire, video camera, light pen, joystick, trackball, scanner, bar code reader and touch screen. Output devices may include monitors, printers, headphones, plotters, televisions, speakers and projectors.

In one example embodiment, a method is disclosed. The method comprises collecting data of a downhole fluid and processing the collected data. The method further comprises inputting the processed collected data to an artificial neural network and estimating saturation pressures based upon the processing of the collected data. The method may further comprise producing a phase envelope for the downhole fluid based upon the estimated saturation pressures.

In one example embodiment, the method may be performed wherein the processing of the collected data involves discretization.

In one example embodiment, the method may be performed wherein temperature values of the collected data are discretized.

In one example embodiment, the method may be performed wherein the phase envelope is produced based upon the discretized temperature values.

In one example embodiment, the method may be performed wherein the collecting of the data of the downhole fluid is through a downhole fluid analysis module.

In one example embodiment, the method may be performed wherein the collecting data of the downhole fluid comprises collecting data related to a pressure and a temperature.

In one example embodiment, the method may be performed wherein the collecting data from the downhole fluid comprises collecting data related to $H_2S$ and $CO_2$.

In another example embodiment, a method of training an artificial neural network for processing data related to a downhole fluid is disclosed. The method may comprise collecting data related to the downhole fluid and processing the collected data related to the downhole fluid. The method may also comprise producing a qualified dataset of the processed collected data and partitioning the qualified dataset of the collected data into a testing data portion and a training data portion. The method may also comprise performing an output validation on the testing data portion. The method may comprise training an artificial neural network model to produce a training data output. The method may also comprise performing an output validation on the training data output.

In one example embodiment, the method may be performed wherein the training the artificial neural network model includes optimization of the artificial neural network.

In one example embodiment, the method may further comprise collecting one of laboratory data, pressure volume temperature reports and equation of state models prior to collecting data related to the downhole fluid.

In one example embodiment, the method may be performed wherein the processing the collected data occurs in a computing arrangement.

In one example embodiment, the method may be performed wherein the collecting data related to a downhole fluid is performed with a downhole fluid analysis module.

In one example embodiment, the method may be performed wherein the artificial neural network has an input layer, a hidden layer and an output layer.

In one example embodiment, the method may be performed wherein the training an artificial neural network model includes using weights for data input to the artificial neural network.

In one example embodiment, the method may be performed wherein the artificial neural network has an input layer, at least two hidden layers and an output layer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A computer-implemented method, comprising:

collecting data of a downhole fluid using a downhole fluid analysis module, the data comprising at least a measured mole percent of each of methane ($C_1$), ethane ($C_2$), propane ($C_3$)-n-pentane ($C_5$), hexane plus fraction ($C_{6+}$), carbon dioxide ($CO_2$), hydrogen sulfide ($H_2S$), and nitrogen ($N_2$) of the downhole fluid;

processing the collected data;

inputting the processed collected data to an artificial neural network;

estimating saturation pressures at each respective temperature among a plurality of temperatures in real-time by the artificial neural network based upon the processing of the collected data, the estimating being based on at least the measured mole percent of each of methane ($C_1$), ethane ($C_2$), propane ($C_3$)-n-pentane ($C_5$), hexane plus fraction ($C_{6+}$), carbon dioxide ($CO_2$), hydrogen sulfide ($H_2S$), and nitrogen ($N_2$) of the downhole fluid and the plurality of temperatures as inputs to the artificial neural network to estimate the saturation pressures at each respective temperature among the plurality of temperatures; and producing a phase envelope for the downhole fluid in real-time by the artificial neural network based on the estimated saturation pressures, wherein the phase envelope is produced in real-time at a wellsite during an exploration phase without direct pressure-volume-temperature testing, wherein a number of training cycles performed by the artificial neural network is regulated to reduce overfitting by a cost function comprising a mean-squared error function, wherein the number of training cycles is less than 50,000, wherein the artificial neural network comprises:

an input layer having 8 inputs respectively comprising the measured mole percent of each of $C_1$, $C_2$, $C_3$-$C_5$, $C_{6+}$, $CO_2$, $H_2S$, $N_2$, and a discretized temperature value, exactly two hidden layers, each hidden layer having exactly 5 neurons, and an output layer having 2 outputs respectively corresponding to a high saturation pressure value and a low saturation pressure value, and wherein the phase envelope is produced by combining the output high saturation pressure value and the output low saturation pressure value across a plurality of discretized temperature values.

2. The method according to claim 1, wherein the processing of the collected data involves discretization.

3. The method according to claim 2, wherein temperature values of the collected data are discretized.

4. The method according to claim 3, wherein the phase envelope is produced based upon the discretized temperature values.

5. The method according to claim 1, wherein the collecting data of the downhole fluid further comprises collecting, using the downhole fluid analysis module, data related to a pressure and a temperature.

6. The method according to claim 5, wherein the collecting data from the downhole fluid comprises collecting, using the downhole fluid analysis module, pressure data and temperature data related to $H_2S$ and $CO_2$.

7. The method of claim 1, further comprising discretizing the phase envelope on a Pressure-Temperature plot along a temperature axis by using a grid ranging from −150° C. to $T_{max}$, with a high-density grid in regions of high-curvature near $P_{max}$ and $T_{max}$ on the envelope.

8. The method of claim 7, wherein, at each grid point, at least one saturation pressure value is encoded to include both a high value and a low value at a given temperature.

9. The method of claim 7, further comprising estimating values for a missing saturation pressure at a grid point on the phase envelope by linearly interpolating two adjacent saturation pressure values.

10. A computer-implemented method of training an artificial neural network for processing data related to a downhole fluid, the method comprising:

collecting, using a downhole fluid analysis module, data related to the downhole fluid, the data comprising at least a measured mole percent of each of methane ($C_1$), ethane ($C_2$), propane ($C_3$)-n-pentane ($C_5$), hexane plus fraction ($C_{6+}$), carbon dioxide ($CO_2$), hydrogen sulfide ($H_2S$), and nitrogen ($N_2$) of the downhole fluid;

processing, by a computer, the collected data related to the downhole fluid to produce a dataset;

partitioning the dataset of the collected data into a testing data portion and a training data portion;

performing an output validation on the testing data portion;

training an artificial neural network model to produce a training data output in real-time of:

a fluid property estimation at each respective temperature among a plurality of temperatures, the fluid property estimation being based on at least the measured mole percent of each of methane ($C_1$), ethane ($C_2$), propane ($C_3$)-n-pentane ($C_5$), hexane plus fraction ($C_{6+}$), carbon dioxide ($CO_2$), hydrogen sulfide ($H_2S$), and nitrogen ($N_2$) of the downhole fluid and the plurality of temperatures as inputs to the artificial neural network to estimate saturation pressures at each respective temperature among the plurality of temperatures; and a phase envelope for the downhole fluid based on the estimated saturation pressures, wherein the phase envelope is produced in real-time at a wellsite during an exploration phase without direct pressure-volume-temperature testing, wherein a number of training cycles performed during the training of the artificial neural network is regulated to reduce overfitting by a cost function comprising a mean-squared error function, wherein the number of training cycles is less than 50,000, wherein the artificial neural network comprises:

an input layer having 8 inputs respectively comprising the measured mole percent of each of $C_1$, $C_2$, $C_3$-$C_5$, $C_{6+}$, $CO_2$, $H_2S$, $N_2$, and a discretized temperature value, exactly two hidden layers, each hidden layer having exactly 5 neurons, and an output layer having 2 outputs respectively corresponding to a high saturation pressure value and a low saturation pressure value, and wherein the phase envelope is produced by combining the output high saturation pressure value and the output low saturation pressure value across a plurality of discretized temperature values; and performing an output validation on the training data output.

11. The method according to claim 10, wherein the training the artificial neural network model includes optimization of the artificial neural network by optimization of weights of the artificial neural network by backward propagation of error during the training.

12. The method according to claim 10, further comprising collecting one or more of: laboratory data, pressure volume temperature reports, or equation of state models prior to the collecting the data related to the downhole fluid.

13. The method according to claim 10, wherein the processing the collected data occurs in a computing arrangement.

14. The method according to claim 10, wherein the artificial neural network comprises an input layer, a hidden layer, and an output layer.

15. The method according to claim 10, wherein the training the artificial neural network model includes using weights for data input to the artificial neural network.

16. The method according to claim 10, wherein the artificial neural network has an input layer, at least two hidden layers, and an output layer.

17. The method according to claim 1, further comprising:

collecting optical information of the downhole fluid in a flow line using a downhole spectrometer;

measuring, by the spectrometer, optical absorbance of the downhole fluid at multiple wavelengths;

identifying, from the measured optical absorbance of the downhole fluid at multiple wavelengths, a fluid type of the downhole fluid; and quantifying, from the measured optical absorbance of the downhole fluid at multiple wavelengths, a weight fractions of each of methane ($C_1$), ethane ($C_2$), propane ($C_3$)-n-pentane ($C_5$), hexane plus fraction ($C_{6+}$), carbon dioxide ($CO_2$), in the downhole fluid, wherein the cost function is expressed by:

$$\text{Cost} = \frac{1}{N}\sum_{i=1}^{N}(y_{target,i} - y_{predict,i})^2 + \lambda_{reg}R_{reg}(f),$$

where:

$$\{x, y\}_1^N$$

is a warning set with N individual data points, x is a vector of input parameters ($x_i$), $R_{reg}(.)$ controls model complexity of the artificial neural network by penalizing large weights, and $\lambda_{reg}$ is a hyper-parameter to define regularization strength, and wherein an Adam optimizer is used to minimize the cost function.

18. The method of claim 17, wherein the artificial neural network is a fully-connected artificial neural network.

* * * * *